United States Patent
Zahalka et al.

(10) Patent No.: US 6,384,162 B1
(45) Date of Patent: May 7, 2002

(54) PROCESS FOR PRODUCTION OF OLEFIN POLYMER WITH LONG CHAIN BRANCHING

(75) Inventors: Hayder A. Zahalka; Dilipkumar Padliya, both of Sarnia; Harald Bender, Bright's Grove, all of (CA)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/738,340

(22) Filed: Dec. 15, 2000

(30) Foreign Application Priority Data

Dec. 17, 1999 (CA) ............................................... 2292387

(51) Int. Cl.[7] ........................... C08F 4/68; C08F 236/20
(52) U.S. Cl. ........................ 526/136; 526/143; 526/144; 526/169.2; 526/282; 526/283; 526/336
(58) Field of Search ................................ 526/143, 144, 526/169.2, 282, 283, 336, 136

(56) References Cited

U.S. PATENT DOCUMENTS

| 3,291,780 A | * | 12/1966 | Gladding et al. | ............ 526/144 |
| 3,489,729 A | * | 1/1970 | Kahle et al. | ............ 526/144 X |
| 3,674,754 A | | 7/1972 | Cameli et al. | .......... 260/79.5 B |
| 5,191,042 A | * | 3/1993 | Cozewith | ................ 526/336 X |
| 5,656,693 A | | 8/1997 | Ellul et al. | .................. 525/171 |
| 5,674,613 A | | 10/1997 | Dharmarajan et al. | ....... 428/378 |
| 5,766,713 A | | 6/1998 | Ravishankar et al. | .... 428/36.92 |
| 5,807,946 A | | 9/1998 | Jourdain et al. | ............. 526/282 |
| 5,919,877 A | | 7/1999 | Tanaglia | ...................... 526/153 |

FOREIGN PATENT DOCUMENTS

| EP | 0 630 914 | 12/1994 |
| EP | 0 967 231 | 12/1999 |
| GB | 1396631 | 6/1973 |

* cited by examiner

*Primary Examiner*—Fred Teskin
(74) *Attorney, Agent, or Firm*—Joseph C. Gil; Noland J. Cheung

(57) ABSTRACT

A process for production of an ethylene-propylene-diene-methylene (EPDM) tetrapolymer having long chain branching is described. The process comprises the step of polymerizing a monomer mixture comprising ethylene, propylene, a first diolefin monomer containing one polymerizable double bond (preferably ENB) and a second diolefin containing two polymerizable double bonds (preferably VNB) in the presence of a catalyst system. The catalyst system comprises: a catalyst comprising a compound containing vanadium +3 with the proviso that the compound does not comprise a halogen directly bound to the vanadium; a halogenated organoaluminum cocatalyst having a halogen to aluminum molar ratio in the range of from about 1 to about 2; and an activator. The branched polymer product of the present process exhibits a molecular weight distribution of less than about 3.5 and improved rheological properties and enhanced processability characteristics.

21 Claims, 2 Drawing Sheets

Figure 1:
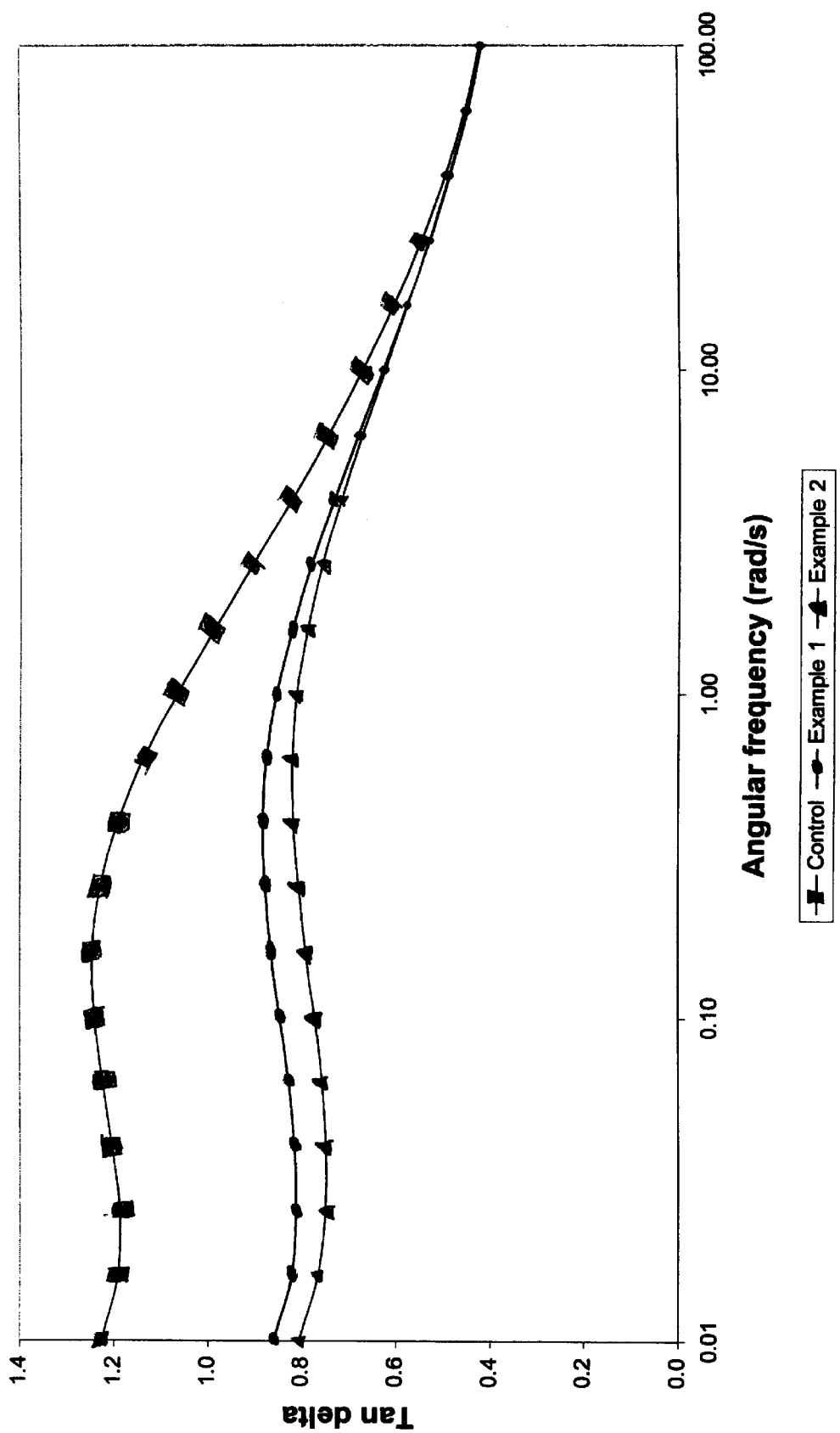

DSR - Normalized stress relaxation modulus
T=75°C

PROCESS FOR PRODUCTION OF OLEFIN POLYMER WITH LONG CHAIN BRANCHING

The present invention relates to a process for production of an olefin polymer, more particulary an EPDM tetrapolymer, having long chain branching.

BACKGROUND OF THE INVENTION

The polymerization of olefins is well known in the art. It is known to produce both crystalline and amorphous polyolefins via the so-called Ziegler-Natta polymerization process.

Generally, the polymerization reaction is catalyzed through the use of a transition metal catalyst compound and a cocatalyst compound. More specifically, it is conventional to produce EPDM (ethylene-propylene-diene-methylene) terpolymers and EPM (ethylene-propylene-methylene) copolymers in solution or slurry processes using Ziegler-Natta catalysts such as $VOCl_3$, $V(acac)_3$ (acac≡acetylacetonate) and $VCl_4$, in combination with an aluminum-based cocatalyst such as diethyl aluminumchloride (DEAC) and/or ethyl aluminum sesquichloride (EASC) and/or ethyl aluminum dichloride (EADC).

Since EPM copolymers typically have low crystallinity, they are highly soluble in saturated hydrocarbon solutions. For this reason, most of the processes used to produce EPDM terpolymers are solution-based. In these processes, as long as the solution viscosity is kept low, very homogenous polymerization conditions can be maintained. At high solution viscosities, mixing becomes difficult and mass transfer limitations occur resulting in the presence of concentration gradients.

Another known process is based on suspension technology in which the EPDM terpolymer is precipitated in situ as discrete particles in a non-reacting diluent. The fluid phase viscosity remains low, enabling good mixing.

The majority of the current EPDM terpolymer production processes employ soluble Ziegler-Natta catalysts for the production of high molecular weight elastomers. These soluble catalysts are typically formed from vanadium compounds in the oxidation state +3 to +5. Examples of such compounds include vanadium trisacetylacetonate ($V(acac)_3$), vanadium tetrachloride ($VCl_4$) and vanadium oxytrichloride ($VOCl_3$). These catalysts are used in conjunction with organoaluminum cocatalyst compound such as triethyl aluminum, DEAC or EASC.

The acidic catalyst system $VOCl_3$ and EASC (G. Ver Strate in Ethylene-Propylene Elastomers, *Ency. Poly. Sci. and Eng.*, 2nd Ed., Vol. 6, p522 (1986)) is the catalyst of choice for most of the EPDM elastomers produced by solution polymerization. Ethylidene norbornene (ENB) is the common diene used in the commercial production of EPDM elastomers. ENB-based EPDM elastomers produced under solution conditions in the presence of the acidic catalyst system $VOCl_3$ and EASC are branched through cationic coupling of the ENB pendent double bond. It has been reported by Ver Strate et al. (Ver Strate, Kresge, and Cozewith, ACS Rubber Division Meeting, Detroit, Mich., May 1 (1973), Paper #7) that the above combination of catalyst-cocatalyst (i.e., $VOCl_3$/EASC) produce an EPDM elastomer having unimodal molecular weight distribution. However, the use of a less acidic cocatalyst, such as DEAC, resulted in production of a polymer which exhibits multi-modal molecular weight distribution—this is disadvantageous.

U.S. Pat. No. 5,674,613 [Narayanaswami et al.], International publication number WO 97/00286 [Ravishankar et al.], International publication number WO 97/00288 [Ellul et al.] and International publication number WO 97/00289 [Jourdain et al.] teach substitution of ENB in a conventional EPDM elastomer with 5-vinylidene-2-norbornene (VNB). According to these references, the resulting elastomer is characterized by improvements in extrusion properties, electrical properties and cure properties compared to EPDM elastomers containing a diene monomer other than VNB. The acidic catalysts systems (e.g., vanadium oxytrichloride/vanadium tetrachloride in combination with DEAC, EASC, etc.) taught in these references for production of the EPDM elastomers are those conventionally used in solution polymerization of EPDM elastomers. The resultant elastomers have a very high molecular weight distribution (MWD)—i.e., most preferably above 15.

It is also known to conduct suspension polymerization (also referred to as slurry polymerization) using a catalyst system consisting of $VOCl_3$ as catalyst and EASC as cocatalyst. Further, it is known to conduct suspension polymerization processes by employing a catalyst system consisting of $V(acac)_3$ and DEAC. It is further known that the $VOCl_3$/EASC catalyst/cocatalyst system is more acidic than the $V(acac)_3$/DEAC catalyst/cocatalyst system. It has also been described that the degree of long chain branching is affected by the acidity of the cocatalyst in the $VOCl_3$ catalyst system. That is, an increase in the cocatalyst acidity increases long chain branching in the EPDM terpolymer—see E. N Kresge, C. Cozewith and G. Ver Strate, ACS Rubber Division Meeting, Indiana, May 8, 1984; and E. K. Easterbrook and E. K. Kontos, Polymer and Fiber Science, VCH Publishers, N.Y., Chapter 27 (1992). In suspension polymerization where $V(acac)_3$ is the catalyst and DEAC the cocatalyst, the degree of long chain branching of the EPDM polymer is low.

It is known that the presence of long chain branching in EPDM polymers at various levels improves their cold flow and processing characteristics (E. N. Kresge, C. Cozewith and G. Ver Strate, ACS Rubber Division Meeting, Indiana, May 8, 1984; and K. P. Beardsley and R. W. Tomlinson, ACS Rubber Division Meeting, Detroit, Mich., Oct. 17, 1989). Thus, control of the degree of long chain branching is desirable for tailoring the properties of the resultant polymer to specific applications.

In published European patent application 0,751,155A (Enichem), a process for preparing ethylene-propylene copolymers in suspension is disclosed. The catalyst system employed requires a catalyst containing vanadium in +3 or +5 oxidation state. The vanadium catalyst is premixed in a hydrocarbon solvent with a cocatalyst having the formula $R_nAlX_m$, wherein R is $C_1$–$C_{20}$ alkyl radical, X is halogen, m+n is 3 and n is an integer from 0 to 2. This reference recognizes DEAC as a cocatalyst.

Notwithstanding the foregoing advances in the prior art, there is an ongoing need to have a practical means of introducing long chain branching to an EPDM terpolymer. It would be particularly advantageous if this could be achieved with an otherwise conventional catalyst system. It would be further particularly advantageous if this could be achieved without substantially broadening the molecular weight distribution (MWD) of the polymer product.

SUMMARY OF THE INVENTION

It is an object of the present invention to provide a novel process for production of an olefin polymer which obviates or mitigates at least one of the above-identified disadvantages of the prior art.

Accordingly, in one of its aspects, the present invention provides a process for production of an ethylene-propylene-diene-methylene (EPDM) tetrapolymer having long chain branching, the process comprising the step of polymerizing a monomer mixture comprising ethylene, propylene, a first diolefin monomer containing one polymerizable double bond and a second diolefin containing two polymerizable double bonds in the presence of a catalyst system comprising:

a catalyst comprising a compound containing vanadium +3 with the proviso that the compound does not comprise a halogen directly bound to the vanadium;

a halogenated organoaluminum cocatalyst having a halogen to aluminum molar ratio in the range of from about 1 to about 2; and an activator.

It has now been found that useful EPDM tetrapolymers, with enhanced long chain branching, can be obtained by the combination of: (i) polymerizing a monomer mixture comprising ethylene, propylene, a first diolefin monomer containing one polymerizable double bond (preferably 5-ethylidene-2-norbornene) and a second diolefin containing two polymerizable double bonds (preferably 5-vinylidene-2-norbornene), and (ii) conducting the polymerization in the presence of a catalyst system comprising a catalyst compound containing vanadium which does not have a halogen directly bound to the vanadium, preferably a catalyst compound containing vanadium (β-diketonate) in an oxidation state of +3, more preferably vanadium acetylacetonate (V(acac)$_3$) or tris(2-acetylcyclohexanone) vanadium, and a halogenated organoaluminum cocatalyst, such as diethylaluminum chloride (DEAC) and/or ethylaluminum sesquichloride (EASC) wherein the halogen (preferably chlorine) to aluminum molar ratio is in the range of from about 1 to about 2.

DETAILED DESCRIPTION OF THE INVENTION

Figure 2:
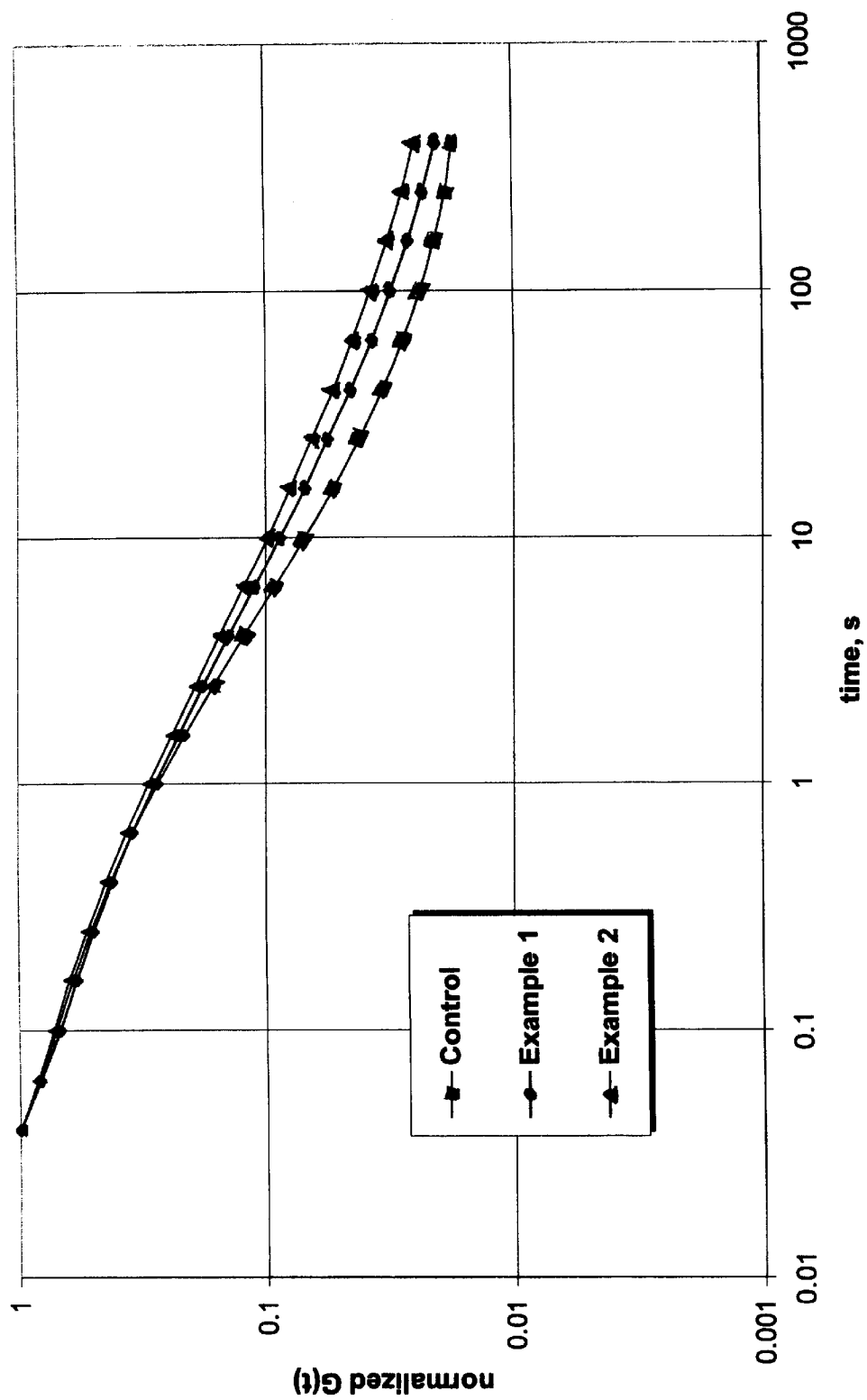

Embodiments of the present invention will be described with reference to the accompanying drawings, in which:

FIG. 1 illustrates tan delta curves for various polymers discussed in the Examples; and FIG. 2 illustates Dynamic Stress Relaxation (DSR) curves for the polymers discussed in the Examples.

The catalyst system used in the present process comprises: a vanadium catalyst, a halogenated organoaluminum cocatalyst and an activator.

The catalyst comprises a compound containing vanadium wherein a halogen (typically chlorine) is not directly bound to the vanadium. Preferably, the catalyst is a compound comprising vanadium in a +3 oxidation state. Non-limiting examples of a useful compound may be selected from the group comprising vanadium tris(β-diketonate) such as vanadium tris(acetylacetonate), tris(2-acetylcyclohexanone) vanadium and mixtures thereof. These compounds are within the purview of a person of ordinary skill in the art. The preferred catalyst for use herein is vanadium tris (acetylacetonate).

The second component of the catalyst system is a halogenated organoaluminum cocatalyst. The use of such cocatalysts in Ziegler-Natta polymerization process is conventional and the choice of halogenated aluminum cocatalyst to be used in the catalyst system is within the purview of a person skilled in the art. Non-limiting examples of aluminum cocatalysts useful in the present invention may be selected from the group comprising trimethylaluminum, triethylaluminum, diethyl aluminum hydride, triisobutyl aluminum, tridecyl aluminum, trioctyl aluminum, tridodecyl aluminum, diethyl aluminum methoxide, diethyl aluminum ethoxide, diethyl aluminum phenoxide, diethyl aluminum chloride, ethyl aluminum dichloride, ethyl aluminum sesquichloride, methyl diethoxy aluminum and mixtures thereof, with the proviso that at least one halogenated aluminum cocatalyst be present. As is known to those of skill in the art, if it is desired to utilize ethyl aluminum sesquichloride as the halogenated organoaluminum cocatalyst, it is possible to produce the cocatalyst by mixing equimolar amounts of diethyl aluminum chloride and ethyl aluminum dichloride. Of course, those of skill in the art will recognize the possibility of using other halogenated organoaluminum cocatalyst materials.

In a preferred embodiment of the invention, the halognated organoaluminum cocatalyst is selected from diethyl aluminum chloride and ethyl aluminum sesquichloride, most preferably diethyl aluminum chloride.

The third component of the catalyst system is an activator. The use of an activator in Ziegler-Natta polymerization process is known. The choice and amount of such an activator is within the purview of a person skilled in the art. Preferably, the activator is a chlorinated organic compound. Non-limiting examples of a useful activator may be selected from the group consisting of dichlorophenyl ethyl acetate (DCPEE), monochlorophenyl ethyl acetate (MCPEE), ethyl trichloroacetate, n-butyl perchlorocrotonate, diethyl dichloromalonate, carbon tetrachloride, chloroform and mixtures thereof. The preferred activator for using in the present process is ethyl trichloroacetate. Preferably, the activator and vanadium catalyst are used in amounts of activator to vanadium molar ratio in the range of from about 0.5:1 to about 1000:1, preferably from about 2:1 to about 40:1, more preferably from about 2:1 to about 10:1.

The catalyst system may be used to produce an EPDM tetrapolymer. As used through this specification, the term EPDM tetrapolymer is intended to mean a polymer derived from a monomer mixture comprising ethylene, propylene, a first diolefin monomer having one polymerizable double bond and a second diolefin monomer having two polymerizable double bonds.

The choice of first diolefin monomer is not particularly restricted provided that it have only one polymerizable double bond. Preferably, the first diolefin monomer is selected from the group consisting of 5-ethylidene-2-norbornene, 1,4-hexadiene and mixtures thereof. The most preferred first diolefin monomer for use in the present process is 5-ethylidene-2-norbornene.

The choice of second diolefin monomer is not particularly restricted provided that it have two polymerizable double bonds. Preferably, the second diolefin monomer is selected from the group consisting of 5-vinylidene-2-norbornene, norbornadiene, dicyclopentadiene, 1,5-hexadiene, 1,7-octadiene and mixtures thereof. The most preferred second diolefin monomer for use in the present process is 5-vinylidene-2-norbornene.

Accordingly, the most preferred monomer mixture for use in the present process comprises ethylene, propylene, 5-ethylidene-2-norbornene and 5-vinylidene-2-norbornene.

As will be appreciated by those of skill in the art, the monomer mixture may comprise one or more additional monomers, for example one or more olefin monomers. As used throughout this specification, the term "olefin monomer" is intended to have a broad meaning and encompasses α-olefin monomers, diolefin monomers and monomers containing at least one internal olefin linkage. α-Olefin monomers are well known in the art and the choice thereof for use in this embodiment of the present process is within the purview of a person skilled in the art. Preferably, the additional α-olefin monomer used in the monomer mixture may be selected from the group butene-1, isobutene, pentene-1, hexene-1, octene-1, branched isomers thereof, styrene, α-methylstyrene and mixtures thereof.

Preferably, the monomer mixture comprises ethylene and the first diolefin monomer in amounts which result in a tetrapolymer comprising from about 30 to about 75, more preferably from about 35 to about 65, weight percent ethylene and from about 0.5 to about 20, more preferably from about 1 to about 15, weight percent of the first diolefin monomer, the balance to 100 weight percent being made up with propylene. It is preferred that the second diolefin monomer be present in the polymerization mixture in an amount of up to about 5 weight percent, preferably from about 0.1 to about 4.0 weight percent, more preferably from about 1.0 to about 3.0 weight percent, based on the amount of first diolefin monomer present in the monomer mixture. Preferably, the absolute amount of the second diolefin monomer will be up to about 0.5 weight percent of the entire monomer mixture.

Optionally the present process may be conducted in the presence of a polymer molecular weight regulator. Non-limiting examples of suitable polymer molecular weight regulators include hydrogen and compounds having the formula

wherein M is a metal selected from Group 2 and Group 12 of the Periodic Table, R is a $C_1$–$C_{12}$ alkyl group and n is a number equal to the valence of M.

Preferably, R is selected from the group comprising methyl, ethyl, n-propyl, isopropyl, n-butyl, t-butyl, n-hexyl, n-octyl, n-decyl and the like. More preferably, R is a $C_1$–$C_6$ alkyl group. Most preferably, $R^6$ is an ethyl group.

Preferably, M is selected from the group comprising beryllium, magnesium, calcium, strontium, barium, zinc, cadmium and mercury. Most preferably, M is zinc.

The most preferred molecular weight regulator (if present) for use in the catalyst system may be selected from hydrogen and diethyl zinc.

The molecular weight regulator (if present) may be used in a conventional amount and in a conventional manner.

Polymerization of the monomer mixture using the catalyst system preferably is carried out in a polymerization medium containing an inert hydrocarbon which is a solvent at least for the olefin monomer and the catalyst system. When the polymerization process is slurry polymerization, one of the reactants (e.g., propylene) may be used as the polymerization diluent or a hydrocarbon in which the product polymer is insoluble may be used as the diluent. Polymerization of the olefin monomer(s) may be carried out batchwise or in a continuous manner. The preferred process involves continuous slurry polymerization in which ethylene, propylene, 5-ethylidene-2-norbornene and 5-vinylidene-2-norbornene, and the catalyst system are continuously supplied to a reaction zone and the product polymer is formed as a slurry in the liquid phase.

Suitable inert hydrocarbons for use as the polymerization medium are those selected from the group comprising $C_4$–$C_8$ aliphatic hydrocarbons, $C_5$–$C_{10}$ cyclic aliphatic hydrocarbons, $C_6$–$C_9$ aromatic hydrocarbons, $C_3$–$C_8$ monoolefinic hydrocarbons and mixtures thereof. Non-limiting examples of such hydrocarbons include: (i) straight and branched chain hydrocarbons such as butane, isobutane, pentane, hexane, octane and the like; (ii) cyclic and alicyclic hydrocarbons such as cyclopentane, cyclohexane, cycloheptane, ethylcyclopentane, methylcyclohexane, methylcycloheptane and the like; (iii) alkyl-substituted aromatic hydrocarbons such as toluene, xylene and the like; and (iv) liquid olefins which may act as monomers or comonomers such as propylene, butene-1 and the like.

The choice of relative proportions of the aluminum (i.e., from the halogenated organoaluminum cocatalyst) and total vanadium (i.e., from the vandium catalyst) is within the purview of a person skilled in the art. Thus, the ratio of the molar amount of the aluminum cocatalyst to the total molar amount of vanadium catalyst is preferably in the range of from about 10:1 to about 1000:1, more preferably from about 10:1 to about 60:1, most preferably from about 10:1 to about 35:1.

The present process is generally carried out at temperatures in the range of from about –40° C. to about 200° C., preferably from about –20° to about 100° C., more preferably from about 0° C. to about 80° C., and at a pressure in the range of from about 5 to about 700 psig.

The precise mode of carrying out the present process is not particularly restricted. In one preferred embodiment, the present process may be carried out by first introducing the hydrocarbon diluent into a stirred tank reactor together with the olefin and diolefin monomer, and adjusting the pressure of the reactor contents so that the temperature of the reactor contents are brought to the desired level. Ethylene gas may be introduced either into the vapour phase of the reactor or sparged into the liquid phase as is known in the art. Thereafter, a hydrocarbon solution of the vanadium compound containing a desired amount of the activator and a hydrocarbon solution of the halogenated organoaluminum cocatalyst in the desired ratios are introduced in the liquid phase. The polymerization occurs substantially in the liquid phase, a slurry of the product polymer being formed in the diluent. The rate of polymerization may be controlled by the rate of catalyst addition. The reactor temperature and pressure may be controlled through the vaporization of the liquid phase as well as by cooling coils, jackets, etc. Since the present process involves the use of a monomer mixture, the content of any one monomer in the polymer product may be controlled by manipulating the feed rates of the respective olefin monomers to the reactor and by manipulating the concentration of catalyst fed to the reactor. The polymer product may be recovered in a conventional manner by flashing off the lower boiling compounds either at reduced pressure or by treatment of the slurry with a mixture of steam and hot water, and by the use of a devolatilizing extruder or by further steam stripping and subsequent dewatering and drying. In a preferred continuous process, the mean residence time of the catalyst and polymer in the reactor is generally from about 20 minutes to 8 hours, preferably from about 30 minutes to about 4 hours, more preferably from about 30 minutes to about 2 hours.

The present process may be used to produce EPDM tetrapolymers having a desirable Mooney viscosity. Viscoelastic property measurements show that the EPDM tetrapolymers prepared using the present process have higher levels of long chain branching compared to EPDM terpolymers made using conventional catalyst systems.

Embodiments of the invention will be illustrated with reference to the following Examples which are provided for illustrative purposes and should not be used to construe or limit the scope of the invention.

EXAMPLES

In the Examples, the weight percent ethylene in the polymer products was determined by Fourier Transform Infra Red (FTIR) spectroscopy in accordance with ASTM D-3900. Thus, polymeric films were pressed at 150° C. and the spectra recorded. The ethylene content was determined by measuring the peak heights at 720 cm$^{-1}$ and 1155 cm$^{-1}$, and performing the calculation using empirically derived relationships. The ENB content was measured by FTIR spectroscopy in accordance with ASTM D-6047-96. The Mooney viscosity (ML 1+4 @ 125° C.) of the polymer products was determined using a Mooney viscometer in accordance with ASTM D-1646. The Mn and molecular weight distribution of the products were determined by gel permeation chromatography (GPC) at 140° C. using trichlorobenzene as a solvent. The viscoelastic properties of the polymers were determined using a Rheometrics Mechanical Spectrometer (RMS-800) at 100° C. and frequency sweep (0.01 to 100 rad/sec.) at 10% dynamic strain.

EXAMPLES 1–2

Various polymers were produced based on a monomer mixture consisting of ethylene, propylene, 5-ethylidene-2-norbornene and 5-vinylidene-2-norbornene.

Thus, 5-vinylidene-2-norbornene was preblended with or added separately to 5-ethylidene-2-norbornene in the amounts shown in Table 1. In the Control polymer 5-ethylidene-2-norbornene was the only diolefin in the monomer mixture (i.e., 5-vinylidene-2-norbornene was not used during polymerization) and thus, the Control Example is provided for comparative purposes only.

The catalyst system used in all Examples was comprised of vanadium tris(acetylacetonate) (V(acac)$_3$) as the catalyst, diethyl aluminumchloride (DEAC) as the cocatalyst and ethyl trichloroacetate (ETA) as the catalyst activator.

Diethyl zinc (DEZ) was used as a molecular weight regulator.

The amounts of V(acac)$_3$, DEAC, ETA and DEZ used in each Example are summarized in Table 1.

The methodology used in each Example was as follows.

A continuous polymerization reaction was run in a reactor which was provided with an agitator and fitted with an evaporative cooling device. The reactor was first charged with propylene, ENB, ethylene and hydrocarbon diluent, and the reactor contents were allowed to equilibrate at a temperature of about 10° C. Continuous flows of gaseous ethylene, a 1 weight percent solution of DEAC in cyclohexane and a 0.2 weight percent solution of V(acac)$_3$ in toluene (containing about 4:1 molar ratio of activator to vanadium) were then fed to the reactor. The pressure of the reactor contents was periodically adjusted to about 71 psig in order to maintain the temperature at about 10° C. The onset of the reaction usually took 10–20 minutes from the start of the addition of catalyst and cocatalyst flows. Thereafter, the reactor was put into a continuous mode of operation with continuous flows of the monomers and molecular weight regulator was also fed to the reactor.

The mean residence time of the reactants in the reactor was on the order of 1.5 hours. The polymer slurry was collected in a vessel containing water to which an antioxidant had been added. The polymer slurry was subsequently stripped with steam in order to remove residual hydrocarbons and the polymer product was then dried.

The properties of the polymers produced in these Examples are set out in Table 1. In Table 1, the Control polymer is an ethylene-propylene-ENB terpolymer made using the same catalyst as described above but without inclusion of VNB. In Examples 1 and 2 the % VNB reported is in terms of the amount of VNB added to the ENB stream.

TABLE 1

| | Flow Recipe (moles/hour) | | |
|---|---|---|---|
| | | Example | |
| | Control | 1 | 2 |
| Propylene | 100 | 100 | 100 |
| Diluent | 75 | 75 | 75 |
| Ethylene | 20 | 20 | 20 |
| ENB | 1.2 | 1.2 | 1.2 |
| Catalyst | 0.0013 | 0.0013 | 0.0013 |
| Cocatalyst | 0.018 | 0.018 | 0.018 |
| Cl/Al Molar Ratio | 1.25 | 1.25 | 1.25 |
| Mol. Wt. Regulator | 0.01 | 0.01 | 0.01 |
| % VNB added to ENB | 0 | 1.5 | 2 |
| ML 1 + 4 @ 125° C. | 58 | 60 | 55 |
| Wt. % ENB | 8.2 | 8.6 | 8.7 |
| Wt. % ethylene | 51.2 | 51.6 | 51.9 |
| Mn, x 10$^3$ | 181 | 161 | 121 |
| MWD | 2.4 | 2.8 | 3.2 |

The results in Table show that molecular weight (Mn) and molecular weight distribution (MWD) for the polymers produced in Examples 1 and 2 are slightly broader than the Control polymer.

The viscoelastic properties of the polymers in Table 1 were determined. FIG. 1 illustrates the tan delta (G"/G') curves. These curves demonstrate that 0.12 to 0.16 percent VNB under slurry polymerization and the described catalyst system have a profound effect on the Theological properties of the polymer. That is, the tan delta of Examples 1 and 2 are substantially lower than that of the Control polymer. Thus, the polymers of Examples 1 and 2 have higher levels of long chain branching compared to the Control polymer. This translates into improved elasticity and processability for polymers of Examples 1 and 2 compared to the Control polymer.

The polymer of Example 2 and the Control were subjected to various extrusion experiments on a 45 mm Model GLS 45K extruder from Troester. The extruder was operated at a die temperature of 100° C. and a screw speed of 60 rpm. The results of the various experiments are set out in Table 2.

TABLE 2

| | Example | |
|---|---|---|
| | Control | 2 |
| Torque (Nm) | 598 | 586 |
| Pressure (Bar) | 87 | 86 |
| Extrusion Rate (ccm/minute) | 427 | 432 |
| Energy Requirement (kNm/ccm) | 31.6 | 30.7 |

The results in Table 2 show that the polymer of Example 2 is more efficiently processed than the Control polymer.

The Dynamic Stress Relaxation (DSR) properties of the polymers in Table 1 were determined. FIG. 2 illustrates the resulting DSR curves which show the shear stress relaxation modulus as a function of time at 75° C. These curves confirm the results of the tan delta curves illustrated in FIG. 1, namely that the polymers of Examples 1 and 2 have higher levels of long chain branching compared to the Control polymer. This translates into improved elasticity and processability for polymers of Examples 1 and 2 compared to the Control polymer.

What is claimed is:

1. A process for production of an ethylene-propylene-diene-methylene (EPDM) tetrapolymer having long chain branching, the process comprising the step of polymerizing a monomer mixture comprising ethylene, propylene, a first diolefin monomer containing one polymerizable double bond and a second diolefin monomer containing two polymerizable double bonds in the presence of a catalyst system comprising:

a catalyst comprising a compound containing vanadium +3 with the proviso that the compound does not comprise a halogen directly bound to the vanadium;

a halogenated organoaluminum cocatalyst having a halogen to aluminum molar ratio in the range of from about 1 to about 2; and an activator.

2. The process defined in claim 1, wherein the first diolefin monomer is selected from the group consisting of 5-ethylidene-2-norbornene, 1,4-hexadiene and mixtures thereof.

3. The process defined in claim 1, wherein the second diolefin monomer is selected from the group consisting of 5-vinylidene-2-norbornene, norbornadiene, dicyclopentadiene, 1,5-hexadiene, 1,7-octadiene and mixtures thereof.

4. The process defined in claim 1, wherein the first diolefin monomer comprises 5-ethylidene-2-norbornene and the second diolefin monomer comprises 5-vinylidene-2-norbornene.

5. The process defined in claim 1, wherein said step of polymerization is conducted in an inert diluent in which the polymer is substantially insoluble.

6. The process defined in claim 5, wherein the inert diluent is selected from the group consisting of propane, n-butane, cyclohexane, n-pentane and mixtures thereof.

7. The process defined in claim 1, wherein each of the catalyst and the cocatalyst are used in an amount to provide an aluminum to vanadium molar ratio in the range of from about 10:1 to about 1000:1.

8. The process defined in claim 7, wherein each of the catalyst and the cocatalyst are used in an amount to provide an aluminum to vanadium molar ratio in the range of from about 10:1 to about 60:1.

9. The process defined in claim 8, wherein each of the catalyst and the activator are used in an amount to provide an activator to vanadium molar ratio in the range of from about 10:1 to about 35:1.

10. The process defined in claim 9, wherein the catalyst comprises a vanadium tris (β-diketonate).

11. The process defined in claim 10, wherein the catalyst is selected from the group consisting of vanadium tris (acetylacetonate), tris(2-acetykcyclohexanone) vanadium and mixtures thereof.

12. The process defined in claim 11, wherein the catalyst comprises vanadium tris(acetylacetonate).

13. The process defined in claim 11, wherein the catalyst comprises tris(2-acetylcyclohexanone) vanadium.

14. The process defined in claim 1, wherein the step of polymerizing is conducted at a temperature in the range of from about −50° to about 150° C.

15. The process defined in claim 1, wherein the aluminum cocatalyst is selected from the group consisting of trimethylaluminum, triethylaluminum, diethyl aluminum hydride, triisobutyl aluminum, tridecyl aluminum, tridodecyl aluminum, diethyl aluminum methoxide, diethyl aluminum ethoxide, diethyl aluminum phenoxide, diethyl aluminum chloride, ethyl aluminum sesquichloride, ethyl aluminum dichloride, methyl diethoxy aluminum and mixtures thereof, with the proviso that at least one halogenated aluminum cocatalyst be present.

16. The process defined in claim 15, wherein the halogenated organoaluminum cocatalyst is selected from the group consisting of diethyl aluminum chloride, ethyl aluminum sesquichloride and mixtures thereof.

17. The process defined in claim 1, wherein the activator comprises a chlorinated organic compound.

18. The process defined in claim 17, wherein the organic compound is selected from the group consisting of dichlorophenyl ethyl acetate (DCPEE), monochlorophenyl ethyl acetate (MCPEE), ethyl trichloroacetate, n-butyl perchlorocrotonate, diethyl dichloromalonate, carbon tetrachloride, chloroform and mixtures thereof.

19. The process defined in claim 18, wherein the activator is selected from the group consisting of ethyl trichloroacetate, dichlorophenyl ethyl acetate (DCPEE) and mixtures thereof.

20. The process defined in claim 1, wherein the process is carried out in the presence of a molecular weight regulator.

21. The process defined in claim 1, wherein EPDM tetrapolymer comprises a molecular weight distribution of less than about 3.5.

* * * * *